US012047745B2

(12) United States Patent
Schmidt

(10) Patent No.: US 12,047,745 B2
(45) **Date of Patent: *Jul. 23, 2024**

(54) MODULAR HEARING INSTRUMENT COMPRISING ELECTRO-ACOUSTIC CALIBRATION PARAMETERS

(71) Applicant: GN Hearing A/S, Ballerup (DK)

(72) Inventor: Flemming Schmidt, Virum (DK)

(73) Assignee: GN HEARING A/S, Ballerup (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/308,653

(22) Filed: Apr. 27, 2023

(65) Prior Publication Data

US 2023/0269544 A1 Aug. 24, 2023

Related U.S. Application Data

(63) Continuation of application No. 17/099,684, filed on Nov. 16, 2020, now Pat. No. 11,689,865, which is a (Continued)

(30) Foreign Application Priority Data

Dec. 30, 2016 (EP) .................................... 16207591

(51) Int. Cl.
*H04R 25/00* (2006.01)

(52) U.S. Cl.
CPC ........... *H04R 25/30* (2013.01); *H04R 25/305* (2013.01); *H04R 25/60* (2013.01); *H04R 25/607* (2019.05);

(Continued)

(58) Field of Classification Search
None
See application file for complete search history.

(56) References Cited

U.S. PATENT DOCUMENTS 6,115,478 A 9/2000 Schneider
7,512,448 B2 3/2009 Malick (Continued)

FOREIGN PATENT DOCUMENTS

EP 2 061 274 5/2009
EP 2061274 5/2009

(Continued)

OTHER PUBLICATIONS

Non-Final Office Action for U.S. Appl. No. 17/099,684 dated Sep. 1, 2022.

(Continued)

*Primary Examiner* — Antim G Shah
(74) *Attorney, Agent, or Firm* — Vista IP Law Group, LLP

(57) ABSTRACT

A hearing instrument includes: a first portion shaped and sized for placement at a pinna of a user's ear; and a second portion having an earpiece for placement in the user's ear canal; wherein the second portion also comprises a connector assembly configured for electrically coupling to the first portion, the connector assembly having a plurality of connector wires, the plurality of connector wires comprising a first connector wire; wherein the second portion also comprises a receiver or miniature loudspeaker for receipt of an audio drive signal through at least the first connector wire; and wherein the second portion also comprises a non-volatile memory circuit having a data interface configured for receipt and transmittal of module data, the non-volatile memory circuit configured to store the module data, wherein the stored module data at least comprises electroacoustic calibration parameter(s) of the receiver or the miniature loudspeaker.

13 Claims, 4 Drawing Sheets

Related U.S. Application Data continuation of application No. 15/848,629, filed on Dec. 20, 2017, now Pat. No. 10,863,285.

(52) U.S. Cl.
CPC ........... *H04R 25/70* (2013.01); *H04R 25/603* (2019.05); *H04R 2225/021* (2013.01); *H04R 2225/0213* (2019.05); *H04R 2225/0216* (2019.05); *H04R 2225/57* (2019.05); *H04R 2225/61* (2013.01)

(56) References Cited

U.S. PATENT DOCUMENTS

| | | | | |
|---|---|---|---|---|
| 8,687,833 | B2 | 4/2014 | Probst et al. | |
| 9,426,587 | B2 | 8/2016 | Stoffels et al. | |
| 10,863,285 | B2 * | 12/2020 | Schmidt | H04R 25/305 |
| 11,689,865 | B2 * | 6/2023 | Schmidt | H04R 25/607 381/60 |
| 2003/0128855 | A1 | 7/2003 | Moller | |
| 2005/0095564 | A1 | 5/2005 | Stuart | |
| 2006/0013420 | A1 | 1/2006 | Sacha | |
| 2007/0053523 | A1 | 3/2007 | Iuliis et al. | |
| 2007/0121978 | A1 | 5/2007 | Jang | |
| 2008/0260193 | A1 | 10/2008 | Westermann et al. | |
| 2009/0010467 | A1 * | 1/2009 | Ritter | H04R 25/30 381/314 |
| 2011/0002489 | A1 * | 1/2011 | Schefer | H04R 25/305 381/312 |
| 2013/0083949 | A1 | 4/2013 | Ryan | |
| 2014/0205122 | A1 | 2/2014 | Stoffels et al. | |
| 2015/0023534 | A1 | 1/2015 | Shennib | |
| 2015/0163601 | A1 | 6/2015 | Higgins | |
| 2016/0020744 | A1 | 1/2016 | Kok et al. | |
| 2016/0360328 | A1 | 12/2016 | Schmidt et al. | |
| 2017/0013374 | A1 * | 1/2017 | Larsen | H04R 25/607 |

FOREIGN PATENT DOCUMENTS

| | | |
|---|---|---|
| EP | 2 747 394 | 6/2014 |
| EP | 2747394 | 6/2014 |
| EP | 3101917 | 12/2016 |
| EP | 3 116 240 | 1/2017 |
| EP | 3116240 | 1/2017 |
| WO | WO 02/047215 | 6/2002 |
| WO | WO 02/47215 | 6/2002 |

OTHER PUBLICATIONS

Amendment Response to NFOA for U.S. Appl. No. 17/099,684 dated Dec. 5, 2022.
Notice of Allowance for U.S. Appl. No. 17/099,684 dated Feb. 28, 2023.
Foreign Office Action with translation dated Dec. 21, 2021 for Japanese patent application No. 2017-249993.
Third party observation for European patent application No. EP 20160207591 dated Feb. 25, 2019.
EPO communication for European patent application No. 16207591 dated Aug. 2, 2019.
Translation of Office Action dated Jul. 28, 2021 for Chinese Patent Application No. 201711471899.5.
Translation of Japanese OA dated Mar. 23, 2021 for Japanese patent application No. 2017-249993.
Translation of Chinese OA dated Oct. 9, 2020 for Chinese patent application No. 201711471899.5.
Final Office Action for U.S. Appl. No. 15/848,629 dated Mar. 11, 2020.
Final Office Action for U.S. Appl. No. 15/848,629 dated Nov. 9, 2018.
Non-Final Office Action for U.S. Appl. No. 15/848,629 dated Jun. 11, 2019.
Non-Final Office Action for U.S. Appl. No. 15/848,629 dated May 10, 2018.
Notice of Allownce for U.S. Appl. No. 15/848,629 dated Jul. 29, 2020.
Amendment Response to NFOA for U.S. Appl. No. 15/848,629 dated Nov. 11, 2019.
Amendment Response to NFOA for U.S. Appl. No. 15/848,629 dated Aug. 3, 2018.
Amendment Response to FOA for U.S. Appl. No. 15/848,629 dated Jun. 11, 2020.
Amendment Response to FOA for U.S. Appl. No. 15/848,629 dated Mar. 11, 2019.

* cited by examiner

| HI State | Off | Boot | Normal Operation | RIE Module Disconnected |
|---|---|---|---|---|
| RIE PWR | 0V | 1V8 | 0V | 0V |
| RIE Data | 0V | Input/Output | Input = Vrf/10 | Input = Vrf |
| EEProm Activity | EEProm Off | EEProm Read | EEProm Off | EEProm Off |
| Added current consumption | N/A | <1mA | Vrf/(11xR)A | <10uA |

450

MODULAR HEARING INSTRUMENT COMPRISING ELECTRO-ACOUSTIC CALIBRATION PARAMETERS

RELATED APPLICATION DATA

This application is a continuation of U.S. patent application Ser. No. 17/099,684, filed on Nov. 16, 2020, which is the continuation of U.S. patent application Ser. No. 15/848,629, filed on Dec. 20, 2017, now U.S. Pat. No. 10,863,285, which claims priority to, and the benefit of, European Patent Application No. 16207591.5 filed on Dec. 30, 2016. The entire disclosures of the above applications are expressly incorporated by reference herein.

FIELD

The present disclosure relates in a first aspect to a hearing instrument comprising a first housing portion shaped and sized for placement at a pinna of a user's ear and a second housing portion shaped and sized for placement in the user's ear canal. A connector assembly is configured for electrically interconnecting the first housing portion and the second portion via a plurality of connector wires. The second housing portion comprises a receiver or miniature loudspeaker and a non-volatile memory circuit for storage of module data which at least comprises electroacoustic calibration parameters of the receiver or miniature loudspeaker.

BACKGROUND

Hearing instruments or aids typically comprise a microphone arrangement which includes one or more microphones for receipt of incoming sound such as speech and music signals. The incoming sound is converted to an electrical microphone signal or signals that are amplified and processed in a processing circuit of the hearing instrument in accordance with parameter settings of one or more hearing loss compensation algorithm(s). The parameter settings have typically been computed from the hearing impaired individual's specific hearing deficit or loss for example expressed by an audiogram. An output amplifier of the hearing instrument delivers the processed output signal, i.e. hearing loss compensated output signal, to the user's ear canal via an output transducer such as a miniature speaker, receiver or possibly electrode array.

So-called Receiver-in-Ear (RIE) hearing instruments are known in the art. A RIE hearing instrument comprises a first housing portion, often designated BTE module or section, for placement at a pinna of the user's ear and a second housing portion, often denoted RIE module, for placement in the user's ear canal. The BTE module and RIE module are often mechanically and electrically connected via a suitable releasable connector arrangement. The miniature speaker or receiver may be arranged inside a housing or shell of the RIE module to deliver sound pressure to the hearing impaired user's ear canal. The BTE module will typically hold the control and processing circuit.

However, the releasable nature of the connector arrangement means that different types of RIE modules can be connected to any particular BTE module or a new replacement RIE module can be connected if the original RIE module fails. This interchangeable or replaceable property of the RIE modules is of course desirable for numerous reasons, but leads unfortunately to problems with maintaining accurate electroacoustic performance of the complete RIE hearing instrument during repair or replacement of the RIE module. The interchangeable property can also be a potential patient safety problem if a too powerful RIE module, i.e. possessing higher than expected maximum sound pressure capability, is connected to the BTE module during repair or replacement of the RIE module or even by mixing up different RIE modulus during manufacturing of the RIE hearing instrument.

SUMMARY

A first aspect relates to a hearing instrument comprising:

- a first housing portion shaped and sized for placement at a pinna of a user's ear,
- a second housing portion shaped and sized for placement in the user's ear canal,
- a connector assembly configured for electrically interconnecting the first housing portion and the second portion via a plurality of connector wires. The second housing portion comprises a receiver or miniature loudspeaker for receipt of an audio drive signal through at least a first connector wire and a non-volatile memory circuit comprising a data interface configured for receipt and transmittal of module data and storage of the module data in the non-volatile memory circuit. The stored module data at least comprises electroacoustic calibration parameters of the receiver or miniature loudspeaker.

The present disclosure addresses and solves the above discussed problems with existing RIE hearing instruments. Manufacturing tolerances concerning electroacoustic performance of the receiver, and possibly numerous of other types of sensors of the second housing portion or RIE module, between nominally identical RIE modules may be compensated by the processor of the first housing portion by read out of the stored electroacoustic calibration parameters through the data interface followed by proper exploitation of the electroacoustic calibration parameters in the audio signal processing of the hearing instrument. The electroacoustic calibration parameters may for example be used to adjust certain parameter of a hearing loss compensation algorithm or function executed by the processor as discussed in additional detail below with reference to the appended drawings.

The stored electroacoustic calibration parameters of the non-volatile memory circuit may also prevent performance degradation in connection with repair and replacement of individual RIE modules, because the calibration parameters allow the processor to accurately compensate for the electroacoustic characteristics of the transducer or transducers of the new replacement RIE module.

The processor may comprise a software programmable microprocessor and/or dedicated digital computational hardware for example comprising a hard-wired Digital Signal Processor (DSP). In the alternative, the processor may comprise a software programmable DSP or a combination of dedicated digital computational hardware and the software programmable DSP. The software programmable microprocessor or DSP may be configured to perform any of the above-mentioned tasks by suitable program routines or sub-routines or threads of execution each comprising a set of executable program instructions. The set of executable program instructions may be stored in a non-volatile memory device of the BTE module. The microprocessor and/or the dedicated digital hardware may be integrated on an ASIC or implemented on a FPGA device.

The number of connector wires of the connector assembly may vary depending on characteristics of the second housing portion for example the number of transducers e.g. receivers and microphones, arranged therein. For practical reasons such as size and costs, the number of connector wires will typically be less than 10 for example between 2 and 8 connector wires. Various design efforts may be undertaken to minimize the number of connector wires for example implementing multiple functionalities of a particular connector wire as discussed below with reference to the exemplary use of a data interface wire serving several different functions.

According to a preferred embodiment, the connector assembly comprises:

a first connector element connected to the first housing portion and a second connector element connected to the second housing portion. The first and second connector elements are configured for mechanically coupling the first housing portion to the second housing portion in a releasable manner via the plurality of connector wires to provide an electrically interconnected state of the second housing portion and an electrically disconnected state of the second housing portion. The first connector element may comprise a plug with a plurality of electrical terminals and second connector element may comprise a mating socket, or vice versa, as discussed in additional detail below with reference to the appended drawings.

The first connector element may comprise a first plurality of electrical terminals or pins or pads, e.g. corresponding to the plurality of connector wires, and the second connector element may comprise a second plurality of electrical terminals; said first plurality of electrical terminals being mechanically joined to, or abutted against, respective ones of the second plurality of electrical terminals in the electrically interconnected state and mechanically separated from respective ones of the second plurality of electrical terminals in the electrically disconnected state.

Certain embodiments of the second housing portion may comprise at least one microphone arranged to pick-up sound pressure in the user's ear canal or arranged to pick-up sound pressure from an external environment at the user's ear. The stored module data may comprise electroacoustic calibration parameters of the at least one microphone.

The electroacoustic calibration parameters may be expressed or encoded in numerous ways since the processor of the first housing portion is capable of reading and interpreting the format of electroacoustic calibration parameters. The electroacoustic calibration parameters may for example comprise one or more of:

electroacoustic sensitivity of the receiver, expressed in absolute terms or relative to a reference sensitivity, at one or more frequencies within a predetermined audio frequency range or band and/or:

electroacoustic sensitivity of the at least one microphone, expressed in absolute terms or relative to a reference sensitivity, at one or more frequencies within a predetermined audio frequency range or band.

The module data stored in the non-volatile memory circuit may comprise an identification code of the second housing portion; said identification code being either a unique code amongst all manufactured second housing portions or a non-unique code indicating a particular type of the second housing portion amongst a plurality of types of the second housing portion. The module data stored in the non-volatile memory circuit may comprise various other types of data characterizing physical properties, electrical properties and/or electroacoustic properties of the second housing portion as discussed in additional detail below with reference to the appended drawings.

The data interface of the non-volatile memory circuit may comprise a second connector wire of the plurality of connector wires of the connector assembly where said second connector wire is electrically coupled to a controllable input-output port of the processor wherein the controllable input-output port includes a compatible data interface for reading the stored module data from the non-volatile memory circuit by the processor. The processor may therefore be configured for reading the stored module data from the non-volatile memory circuit via the compatible data interface of the input-output port. Various types of proprietary or industry standard of single-wire or multiple wire data interfaces may be utilized by the processor and non-volatile memory circuit for reading of the module data as discussed in additional detail below with reference to the appended drawings.

According to some embodiments of the present hearing instrument, a third connector wire, of the plurality of connector wires, is connected to a power supply input of the non-volatile memory circuit. The processor of the first housing portion comprises a controllable output port connected to said third connector wire to selectively power-on and power-down the non-volatile memory circuit. The processor may switch the logic state of a controllable output port between logic high and logic low, or tristate (aka high-impedance state), to switch between power-on and power-down of the power supply of the non-volatile memory circuit as discussed in additional detail below with reference to the appended drawings.

According to another attractive embodiment of the hearing instrument, the data interface of the non-volatile memory circuit and the processor comprises a first resistance element arranged in the first housing portion and connecting the second connector wire to a first reference potential. The first reference potential may have a voltage that corresponds to logic high or "1". A second resistance element is arranged in the second housing portion and connects the second connector wire to the third connector wire. By appropriate scaling of the resistances of the first and second resistance elements the processor is able to determine whether or not the second housing portion is correctly connected to the first housing portion during normal use of the hearing instrument without interrupting audio processing. The processor may be configured to detect a logic state of the second connector wire by reading the controllable input-output port and based on the read logic state determining whether the second housing portion is in the electrically interconnected state or the electrically disconnected state as discussed in additional detail below with reference to the appended drawings.

The processor may be configured to energize the non-volatile memory circuit and read the module data only during a boot state of the hearing instrument. This embodiment reduces power consumption of the hearing instrument because the non-volatile memory circuit can be powered-down immediately after a successful reading of the stored module data. According to one such embodiment, the processor is configured to:

power-on the controllable output port to energize the non-volatile memory circuit;

read the stored module data comprising the electroacoustic calibration parameters of the receiver from the non-volatile memory circuit, adjusting one or more parameters of a hearing loss compensation audio processing algorithm or function executed by the processor based on the electroacoustic calibration parameters of the receiver. To save power as mentioned above, the processor is preferably additionally configured or programmed to subsequent to the reading the module data:

power-down the controllable output port, e.g. set logic low or tristate, to remove supply voltage of the non-volatile memory circuit; and maintain power-down of the controllable output port during normal operation of the first housing portion.

The second housing portion may comprise a stiff hollow housing, accommodating at least the receiver or miniature loudspeaker, and a compressible elastomeric or foam plug or mushroom shaped and sized for placement within the user's ear canal. The compressible elastomeric foam plug or mushroom may be interchangeable and may be fastened to, and surround, the stiff hollow housing. The non-volatile memory circuit may be arranged within the plug of the connector assembly as discussed in additional detail below with reference to the appended drawings.

A second aspect relates to a detachable in-the-ear housing portion of a hearing instrument. The detachable in-the-ear housing portion comprises a hollow housing surrounded by an interchangeable compressible plug or mushroom configured for anchoring within the user's ear canal, a connector comprising a plurality of electrical connector wires for connection to a behind-the-ear portion of the hearing instrument, a receiver or miniature loudspeaker for receipt of an audio drive signal through one or more of the plurality of electrical connector wires. The detachable in-the-ear housing portion additionally comprises a non-volatile memory circuit comprising a data interface connected to one or more of the plurality of electrical connector wires for read-out of stored data of the non-volatile memory circuit. The stored data comprises at least electroacoustic calibration parameters of the receiver.

The skilled person will understand that the detachable in-the-ear housing portion according to this second aspect may comprise any of the above discussed RIE modules.

A third aspect relates to a method of determining and storing electroacoustic calibration parameters of at least a receiver or miniature loudspeaker of a detachable in-the-ear housing portion of a hearing instrument. The method preferably comprises:

a) coupling a sound output port of the detachable in-the-ear housing portion to an acoustic coupler of an electroacoustic test system,
b) generating an electric stimulus signal of predetermined level and frequency,
c) applying the electric stimulus signal to the receiver or miniature loudspeaker via a connector of the-in-ear housing portion to generate a corresponding output sound pressure at the sound output port,
d) measuring the output sound pressure in the acoustic coupler,
e) determining the electroacoustic calibration parameters by comparing the measured output sound pressure and known electroacoustic characteristics of the receiver; and
f) writing the electroacoustic calibration parameters to a non-volatile memory circuit of the detachable in-the-ear housing portion for storage.

The method of determining and storing the electroacoustic calibration parameters of at least the receiver or miniature loudspeaker may be carried out during manufacturing of the detachable in-the-ear housing portion. The detachable in-the-ear housing portion may be fabricated separately from its associated BTE portion as discussed in additional detail below with reference to the appended drawings.

A hearing instrument includes: a first portion shaped and sized for placement at a pinna of a user's ear; and a second portion having an earpiece for placement in the user's ear canal; wherein the second portion also comprises a connector assembly configured for electrically coupling to the first portion, the connector assembly having a plurality of connector wires, the plurality of connector wires comprising a first connector wire; wherein the second portion also comprises a receiver or miniature loudspeaker for receipt of an audio drive signal through at least the first connector wire; and wherein the second portion also comprises a non-volatile memory circuit having a data interface configured for receipt and transmittal of module data, the non-volatile memory circuit configured to store the module data, wherein the stored module data at least comprises electroacoustic calibration parameter(s) of the receiver or the miniature loudspeaker.

Optionally, the first portion comprises a first connector element, and wherein the connector assembly comprises a second connector element; wherein the connector assembly of the second portion is configured for mechanically coupling to the first portion in a releasable manner via the first and second connector elements, wherein when the first and second connector elements are connected, the second portion has an electrically interconnected state, and wherein when the first and second connector elements are disconnected, the second portion has an electrically disconnected state.

Optionally, the first connector element comprises a first plurality of electrical terminals and the second connector element comprises a second plurality of electrical terminals, the first plurality of electrical terminals being mechanically joined to, or abutted against, respective ones of the second plurality of electrical terminals when the second portion is in the electrically interconnected state and mechanically separated from respective ones of the second plurality of electrical terminals when the second portion is in the electrically disconnected state.

Optionally, the second connector element comprises a plug with the second plurality of electrical terminals, and wherein the non-volatile memory circuit is in the plug.

Optionally, the second portion further comprises: at least one microphone arranged to pick-up sound pressure in the user's ear canal or arranged to pick-up sound pressure from an external environment at the user's ear; wherein the stored module data also comprises electroacoustic calibration parameter(s) of the at least one microphone.

Optionally, the electroacoustic calibration parameter(s) comprises: electroacoustic sensitivity of the receiver, expressed in absolute term(s) or relative to a first reference sensitivity; and/or electroacoustic sensitivity of the at least one microphone, expressed in absolute term(s) or relative to a second reference sensitivity.

Optionally, the module data stored in the non-volatile memory circuit comprises an identification code of the second portion; and wherein the identification code is either a unique code amongst all manufactured second portions or a non-unique code indicating a particular type of the second portion amongst a plurality of types of the second portion.

Optionally, the hearing instrument further includes a processor in the first portion.

Optionally, the plurality of connector wires comprises a second connector wire; and wherein the second connector wire is configured to electrically couple to a controllable input-output port of the processor, wherein the controllable input-output port comprises a communication interface for reading the stored module data from the non-volatile memory circuit by the processor.

Optionally, the plurality of connector wires comprises a third connector wire connected to a power supply input of the non-volatile memory circuit; and wherein the third connector wire is configured to connect to the first portion, the first portion comprising a controllable output port configured to selectively power-on and power-down the non-volatile memory circuit via the third connector wire.

Optionally, the communication interface comprises a first resistance element configured to connect the second connector wire to a first reference potential.

Optionally, the processor is configured to: detect a logic state of a second connector wire in the plurality of connector wires, and based on the detected logic state, determine whether the second portion is in an electrically interconnected state or an electrically disconnected state.

Optionally, the processor is configured to detect the logic state of the second connector wire by reading the logic state through a controllable input-output port of the processor.

Optionally, the processor is configured to, during its booting state: power-on the controllable output port to energize the non-volatile memory circuit; read the stored module data comprising the electroacoustic calibration parameter(s) of the receiver or the miniature loudspeaker from the non-volatile memory circuit; and adjust one or more parameters of a hearing loss compensation audio processing algorithm, or a function, to be executed by the processor based on the electroacoustic calibration parameter (s) of the receiver or the miniature loudspeaker.

Optionally, the processor is configured to, subsequent to the reading of the module data: power-down the controllable output port to remove supply voltage of the non-volatile memory circuit; and maintain power-down of the controllable output port during normal operation of the first portion.

Optionally, the second portion comprises a stiff hollow housing, accommodating at least the receiver or the miniature loudspeaker, and the non-volatile memory circuit.

A detachable portion of a hearing instrument, includes: a hollow housing at least partially surrounded by an ear piece that is configured for placement in a user's ear canal; a connector comprising a plurality of electrical connector wires for connection to a behind-the-ear portion of the hearing instrument; a receiver or miniature loudspeaker for receipt of an audio drive signal through at least a first one of the plurality of electrical connector wires; and a non-volatile memory circuit comprising a data interface connected to at least a second one of the plurality of electrical connector wires that is configured for allowing read-out of stored data in the non-volatile memory circuit; wherein the stored data at least comprises electroacoustic calibration parameter(s) of the receiver or the miniature loudspeaker.

A method of determining and storing electroacoustic calibration parameter(s) of at least a receiver or miniature loudspeaker of a detachable portion of a hearing instrument, the method includes: coupling a sound output port of the detachable portion to an acoustic coupler of an electroacoustic test system; generating an electric stimulus signal; applying the electric stimulus signal to the receiver or the miniature loudspeaker via a connector of the detachable portion of the hearing instrument to generate a corresponding output sound pressure at the sound output port; measuring the output sound pressure; determining the electroacoustic calibration parameter(s) by comparing the measured output sound pressure and known electroacoustic characteristic(s) of the receiver or the miniature loudspeaker; and storing the electroacoustic calibration parameter(s) to a non-volatile memory circuit in the detachable portion of the hearing instrument.

Other features, embodiments, and advantageous will be described in the detailed description.

BRIEF DESCRIPTION OF THE DRAWINGS

Embodiments will be described in more detail in connection with the appended drawings in which.

DETAILED DESCRIPTION

Figure 1A:
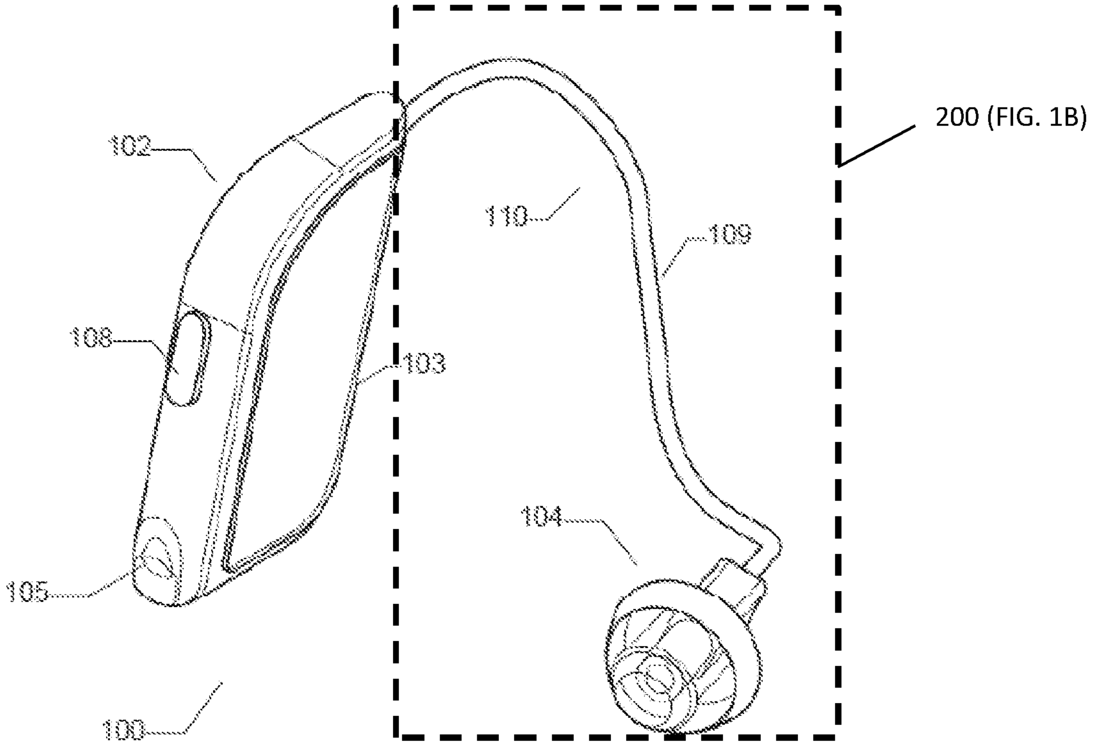
FIG. 1A) shows an exemplary Receiver-in-Ear (RIE) hearing instrument in accordance with a first embodiment.

Various embodiments are described hereinafter with reference to the figures. It should be noted that elements of similar structures or functions are represented by like reference numerals throughout the figures. Like elements or components will therefore not necessarily be described in detail with respect to each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

In the following various exemplary embodiments of a Receiver-in-Ear (RIE) hearing instrument are described with reference to the appended drawings. The skilled person will understand that the appended drawings are schematic and simplified for clarity. The skilled person will further appreciate that certain actions and/or steps may be described or depicted in a particular order of occurrence while those skilled in the art will understand that such specificity with respect to sequence is not actually required.

FIG. 1A) shows an exemplary hearing instrument 100 in accordance with various embodiments. The hearing instrument 100 comprises a first housing portion 102 and a second housing portion 200 mechanically and electrically connected to each other via a connector assembly 110 to form a so-called Receiver-in-Ear (RIE) hearing instrument 100. The skilled person will appreciate that the first housing portion 102, or BTE module 102, typically is shaped and sized for placement at a pinna or auricle of the hearing impaired user's ear—for example behind a back of the pinna where it may be hidden or partly invisible. The second housing portion 200 is typically shaped and sized for, or configured for, placement inside the user's ear canal. The connector assembly 110 comprises a plurality of connector wires (not shown) for example between 2 and 10, such as eight, individual electrical wires configured to interconnect various electrical circuit components of the first and second housing portions 102, 200 as discussed below in additional detail. The connector assembly 110 may comprises an elastomeric or plastic tube 109 surrounding and protecting the plurality of connector wires. The first housing portion 102 may comprise a hollow relatively rigid housing structure 103 accommodating therein various electronic circuitry of the first housing portion. This rigid housing structure 103 may be fabricated by injection moulding of a suitable elastomeric compound. The rigid housing structure 103 serve to protect the components and electronic circuitry of the first housing portion from potentially harmful forces and contaminants of the external environment such as dust, humidity, light and mechanical shocks. The first housing portion 102 may comprise a battery chamber 105 for holding a disposable battery such as a Zinc-Air battery cell. Other embodiments of the RIE hearing instrument 100 may comprise a rechargeable battery cell or cells. The first housing portion 102 may comprise a front microphone (not shown) and/or a rear microphone (not shown) for conversion of an acoustic sound signal into respective audio sound signals and one or several A/D converters (not shown) for conversion of the audio sound signals into respective digital audio signals. The first housing portion 102 may comprise a processor, such as software programmable microprocessor, configured to generate a hearing loss compensated output signal based on the digital audio signals. The hearing loss compensated output signal, or audio drive signal, is computed by a hearing loss compensation algorithm and transmitted through at least a first connector wire of the plurality of connector wires discussed above to a receiver or miniature loudspeaker enclosed within the second housing portion 200. The first housing portion 102 comprises a user actuable button or switch 108 allowing the user to control various functions and settings of the RIE hearing instrument 100 in accordance with his/hers own preferences such as a volume setting and preset program selection etc.

Figure 1B:
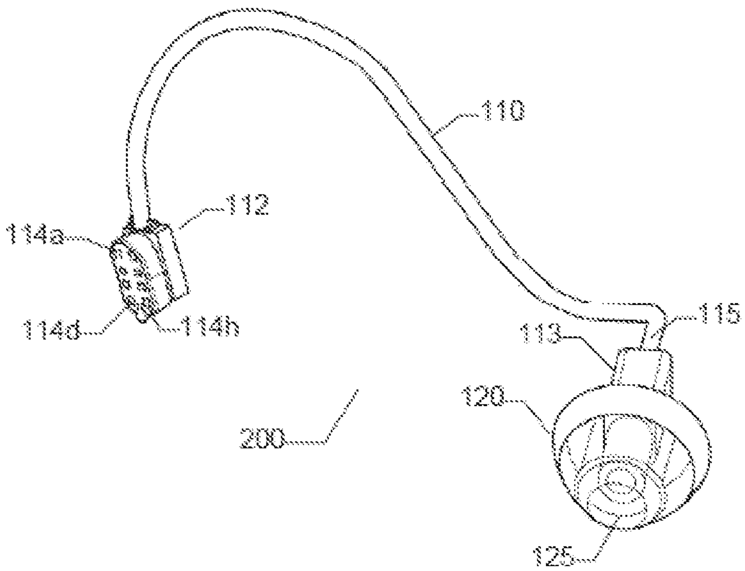
FIG. 1B) shows an in-the-ear housing portion of the Receiver-in-Ear (RIE) hearing instrument.
Figure 2:
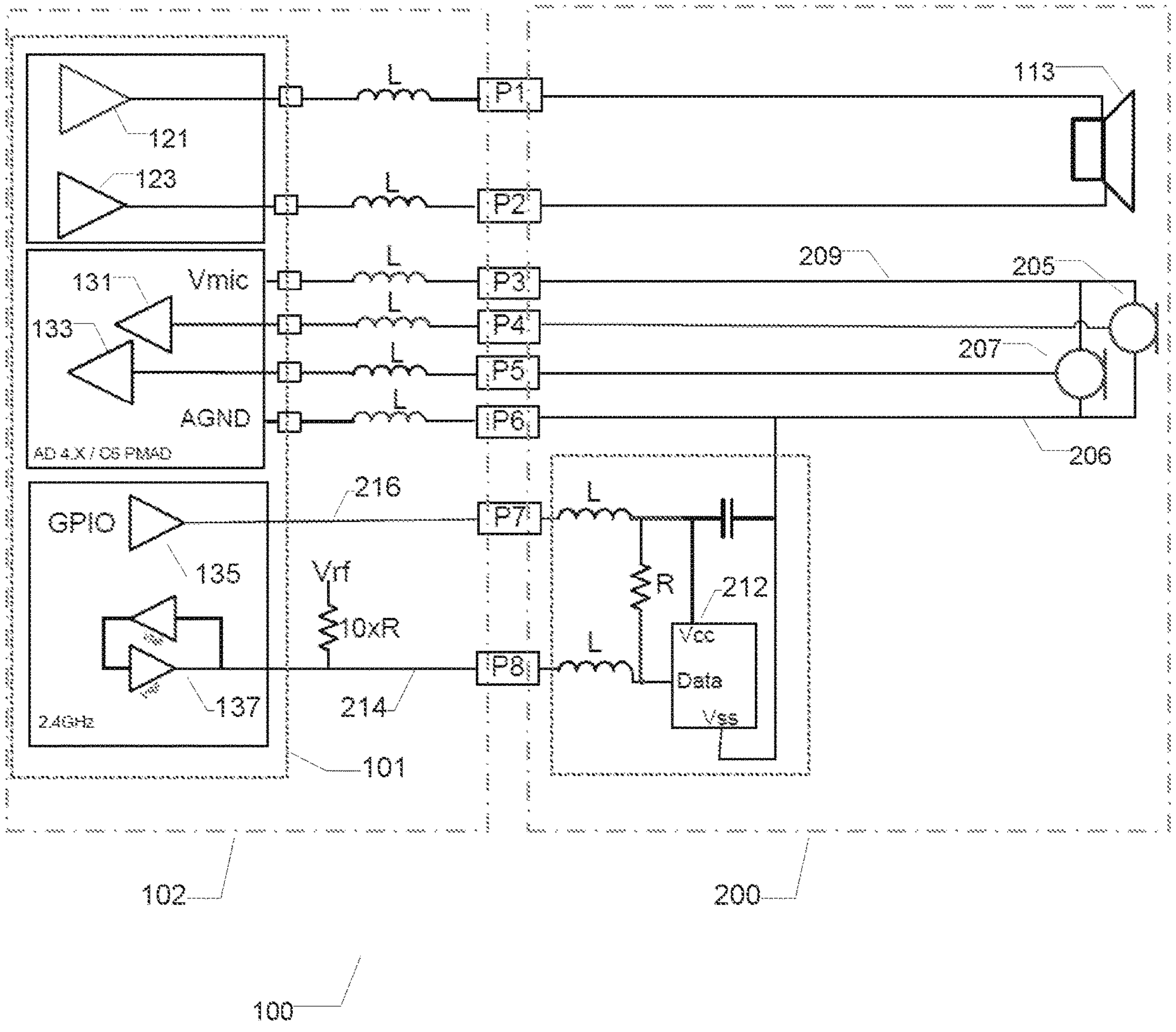
FIG. 2 shows a simplified electrical circuit diagram of the Receiver-in-Ear (RIE) hearing instrument.

The second housing portion 200, or RIE Module, is illustrated in detail on FIG. 1B) in a disconnected state where the housing portion 200 is electrically and mechanically disconnected from the first housing portion 102. The second housing portion 200 comprises a moving armature receiver or miniature loudspeaker 113 for receipt of an audio drive signal through the previously discussed first connector wire (refer to FIG. 2). The miniature loudspeaker 113 may be enclosed within a rigid housing structure for example fabricated by injection molding and serve to attenuate sound pressure leakage and protect the miniature loudspeaker 113 from potentially harmful forces and contaminants of the external environment such as dust, humidity, light and mechanical shocks. A proximal end 115 of the previously discussed connector assembly 110 may be fixedly terminated at the rigid housing structure of the second housing portion 200 and the plurality of electrical connector wires are connected to the electrical circuitry held therein as discussed in additional detail below with reference to FIG. 2. A connector plug 112 comprising a plurality of electrical terminals or pads 114*a*-114*e* is arranged at the distal end of the connector assembly 110. Each of the electrical terminals or pads 114*a*-114*h* mates in a releasable manner to a corresponding electrical terminal (not shown) of a corresponding connector element or connector socket (not visible) arranged at a rear surface of the first housing portion 102. Hence, in the electrically interconnected state between the first and second housing portions 102, 200 the plurality of electrical terminals 114*a*-114*h* of the plug 112 are mechanically joined to, or abutted against, respective ones of the plurality of electrical terminals of the first housing portion 102. Conversely, in the electrically disconnected state of the first and second housing portions 102, 200, the plurality of electrical terminals 114*a*-114*h* of the plug 112 are mechanically separated from respective ones of the plurality of electrical terminals of the first housing portion 102. The plug 112 of the second housing portion 200 additionally comprises a non-volatile memory circuit (shown on FIG. 2) for storage of various types of module data associated with mechanical characteristics and/or electrical characteristics and/or electroacoustic characteristics of the second housing portion 200 as discussed in additional detail below with reference to the block diagram of FIG. 2.

A distal portion of the miniature loudspeaker 113, or possibly the previously discussed optional rigid housing, of the RIE Module 200 is surrounded by a compressible plug 120 or mushroom 120 shaped and sized for anchoring within the user's ear canal. The compressible plug 120 comprises a sound channel 125 transmitting or conveying the acoustic output signal, or output sound pressure, generated by the miniature loudspeaker 113 towards the eardrum of the user. This output sound pressure is derived from the previously discussed audio drive signal transmitted through at least the first connector wire of connector assembly. The compressible plug 120 is configured to be comfortably positioned and retained within user's ear canal during use of the RIE hearing instrument 100. The compressible plug 120 may be interchangeable and comprise various types of elastomeric compounds or foam compounds with suitable wear-and-tear properties. The skilled person will appreciate that the compressible plug 120 may be fabricated in numerous sizes to fit different ear canal sizes of different hearing aid users.

Different types or variants of the RIE Module 200 may be connected to the first housing portion 102 via the connector assembly 110 in a standardized manner for example RIE Modules accommodating:

a) one receiver/loudspeaker and zero microphones, b) one receiver/loudspeaker and one microphone positioned for picking-up sound pressure in the user's ear canal, c) one receiver/loudspeaker and one microphone positioned for picking-up sound from the external environment, d) one receiver/loudspeaker and two microphones (e.g. one for directional cues and one for occlusion suppression), etc.

Each of the above-mentioned RIE Module variants may further include several types of receivers with different maximum sound pressure ratings (SPL ratings), e.g. 4 different ratings. Each of the above-mentioned RIE Module variants may furthermore have sound channels 125 of different lengths, e.g. 5 different standard lengths. Still further, RIE Module variants are provided for the left ear and for the right ear. The skilled person will furthermore appreciate that some of the above-mentioned RIE Modules may include other types of sensors than electroacoustic transducers or sensors, such as temperature sensors, pressure sensors, orientation sensors, etc. Thus, a large variety of RIE Modules compatible with the first housing portion 102 may easily be provided. Therefore, the module data held in the non-volatile memory circuit (item 212 of FIG. 2) of the RIE Module 200 may include an identification code of the RIE Module 200 wherein the identification code may be either be a unique code amongst all manufactured RIE Modules or be a non-unique code indicating a particular type or variant of the RIE Module 200. These features allow the processor 101 of the first housing portion 102 to automatically read the identification code of the RIE Module 200 and thereby detect the type or variant of RIE Module actually connected to the first housing portion 102. Hence, preventing the unintended application of an incorrect type of RIE Module 200 and various types of adverse effects on the hearing aid user.

FIG. is a simplified electrical circuit diagram of the exemplary RIE hearing instrument 100 discussed above. The illustrated embodiment of the RIE Module 200 comprises, in addition to the previously discussed miniature loudspeaker or receiver 113, two microphones 205, 207 connected to respective sets of connector wires of the plurality of connector wires leading to the first housing portion 102 or so-called BTE portion or housing. The RIE Module 200 and the first housing portion 102 are mutually interconnected in a releasable manner via the previously discussed mating pairs of connector terminals P1-P8 and their associated connector wires. The miniature loudspeaker 113 is connected to complementary phases of the previously discussed audio drive signal delivered by an H-bridge output driver 121, 123 via the connector terminals P1, P2 and their associated connector wires. The H-bridge output driver 121, 123 may be integrated on a common semiconductor substrate or die together with the processor 101 of the first housing portion 102. The two microphones 205, 207 may share a common ground connection 206 or ground wire 206 which is connected to the appropriate electronic circuitry of the first housing portion 102 through the mating pair of the connector terminals P6. The two microphones 205, 207 may also share a power supply or voltage supply wire 209 which is connected to an appropriate voltage regulator or DC voltage supply of the electronic circuitry of the first housing portion 102 through the mating pair of the connector terminals P3. A microphone output signal of the first microphone 205 is connected to a microphone preamplifier 131 of the electronic circuitry of the first housing portion 102 through the mating pair of the connector terminals P4. A microphone output signal of the second microphone 207 is connected to another microphone preamplifier 133 of the electronic circuitry of the first housing portion 102 through the mating pair of the connector terminals P5. The first microphone 205 may be arranged in the RIE Module 200 to pick-up sound pressure in the user's ear canal during normal operation when the RIE module is appropriately anchored in the user's ear canal. The second microphone 207 may be arranged in the RIE Module 200 to pick-up sound pressure from the external environment for example sound pressure comprising certain directional cues due to the acoustical antenna properties of the user's pinna during normal operation when the RIE module is appropriately anchored in the user's ear canal.

The skilled person will appreciate that the two microphones 205, 207 and their associated connector wires P3-P5 are optional and may be absent in other embodiments of the RIE Module 200 leading to a simplified connector assembly and RIE module albeit with reduced functionality.

The RIE module 200 comprises the previously discussed non-volatile memory circuit 212 for example comprising an EEPROM, EPROM or PROM. A negative supply voltage $V_{SS}$ of the non-volatile memory circuit 212 or EEPROM 212 is connected to the ground potential of the RIE Module 200 on connector terminals P6. A positive power supply $V_{CC}$ of the EEPROM 212 is connected to the connector wire 216 and connector terminal pair P7 such that the EEPROM 212 is powered by a general purpose output port 135, or possibly a general purpose input-output port (GPIO), of the processor 101 of the first housing portion 102 through a connector wire 216. The logic state of the general purpose output port GPIO is controlled by the processor 101 and may be switched between e.g. 0 V to indicate logic low and 1.8 V, or any other suitable DC supply voltage level, to indicate logic high. By writing an appropriate logic state to the general purpose output port GPIO the EEPROM 212 is selectively powered-on and powered-down under processor control. The EEPROM 212 comprises a one-wire bi-directional data interface DATA connected to compatible data port or interface 137 of the processor 101 through the connector wire 214 and connector terminal pair P8. Data transmitted through the one-wire bi-directional data interface may for example be Manchester encoded. While the one-wire data interface uses a minimum of connector wires and terminals, the skilled person will understand that other embodiments may use non-volatile memory circuits with different types of data interfaces for example two-wire industry standard data interfaces such as $I^2C$ or SPI etc. at the expense of occupying additional connector wires.

The connector wire 214 connected to the data interface of the EEPROM 212 is connected to, or pulled-up to, a DC reference potential or voltage Vrf by a first resistance element 10*R arranged inside the first housing portion 102. This first resistance element 10*R pulls the voltage of the data port or interface 137 of the processor 101 to a logic high state or level if, or when, the RIE module 200 is disconnected from the first module 102 as discussed in additional detail below with reference to the flow-charts and state diagrams of FIG. 3 and FIG. 4. The data interface of the EEPROM 212 furthermore comprises a second resistance element R which is connected from the connector wire 214 to the previously discussed connector wire 216. The latter is connected to the GPIO port 135 of the processor 101 in the first housing portion 102. The second resistance element R pulls the voltage of the data port or interface 137 of the processor 101 to a logic low state or level when the RIE module 200 is appropriately connected to the first module 102 during normal use of the hearing instrument as discussed in additional detail below with reference to the flow-charts and state diagrams. The skilled person will understand that each of the first and second resistance elements 10*R, R may comprise a resistor or a suitably biased MOS transistor or any combination thereof. The resistance of the first resistance element 10*R may be at least ten times larger than a resistance of the second resistance element R.

The skilled person will likewise appreciate that the illustrated coils or inductors, L, inserted in each of the connector wires are optional, but may be advantageous in certain situations for example where first housing portion 102 comprises a wireless RF transmitter and/or receiver for example operating according to the Bluetooth standard. The coils or inductors, L, may be arranged at the connector plug 112 for the purpose of suppressing electromagnetic interference caused by data communication between the where first housing portion 102 and RIE module 200 over the data wire 214.

The EEPROM 212 preferably stores various types of module data characterizing physical properties, electrical properties and/or electroacoustic properties of the RIE module 200. The electroacoustic properties of the RIE module 200 preferably at least comprise electroacoustic calibration parameters of the receiver 113. The electroacoustic calibration parameters of the receiver 113 may comprise an electroacoustic sensitivity of the receiver for example expressed in absolute terms, e.g. sound pressure per volt or ampere, at one or more frequencies within a predetermined audio frequency range or band. The one or more audio band frequencies may be selected from a group of 250 Hz, 500 Hz, 1 kHz and 3 kHz or any other audiologically meaningful set of audio frequencies. The electroacoustic calibration parameters of the receiver 113 may alternatively be expressed in relative terms, e.g. in dB, at one or more frequencies within the predetermined audio frequency range relative to corresponding standardized or nominal parameter values of the receiver.

The module data of the RIE module 200 may additionally comprises electroacoustic calibration parameters of each of the first and second microphones 205, 207 such as respective electroacoustic sensitivities expressed in absolute terms, e.g. V per Pa, or relative to a reference sensitivity, at one or more frequencies within the above-discussed predetermined audio frequency range or band. Where the RIE module 200 comprises other types of sensors such as orientation sensors, pressure sensors or temperature sensors, the module data of the EEPROM 212 may include similar calibration parameter of these sensors to improve their accuracy and facilitate interchangeability.

According to certain embodiments of the hearing instrument 100, the processor 101 of the first module 102 is programmed or configured to during its boot state to:

power-on the controllable output port GPIO 135 to energize the non-volatile memory circuit 212 as discussed above. The processor 101 is additionally configured to read all, or at least a subset, of the above-discussed stored electroacoustic calibration parameters of the receiver 113 and/or microphones 205, 207 from the EEPROM 212. The processor 101 thereafter adjusts corresponding parameters of the previously discussed hearing loss compensation algorithm or function executed by the processor 101 based on the read values of the electroacoustic calibration parameters of the receiver and/or microphones. In this manner, the acoustic gain or amplification of the hearing instrument may be adjusted up or down at one or several of the predetermined frequencies to accurately reach a nominal acoustic gain dependent on the value calibration parameters and thereby for example ensure that the hearing aid user actually gets the target gain determined during a fitting procedure. The processor 101 may be configured, e.g. programmed, to adjust various parameter of an occlusion suppression algorithm or function based on the read values of the electroacoustic calibration parameters of one or both of the microphones 205, 207 and thereby compensate for naturally occurring spreads of electroacoustic sensitivity and/or frequency response of hearing aid microphones.

The storage of electroacoustic calibration parameters in the EEPROM 212 and their subsequent exploitation by the processor 101 of the hearing instrument lead to several noteworthy advantages. The RIE modules 200 may be manufactured and tested separately from the associated first housing portion 102 without compromising the accuracy of key acoustic performance metrics of the complete hearing instrument, because manufacturing tolerances between individual RIE modules, in particular concerning electroacoustic performance, are compensated by the processor 101 through read out of the stored electroacoustic calibration parameters of the EEPROM. This feature also prevents performance degradation in connection with repair and replacement of RIE modules failed in the field because the electroacoustic calibration parameters stored the EEPROM 212 allows the processor 101 to accurately compensate for the electroacoustic characteristics of the new replacement RIE module. Hence, the processor 101 may simply read the stored electroacoustic calibration parameters of the receiver 113 and/or microphones 205, 207 from the EEPROM 212 during initial booting of the new replacement RIE module ensuring that the hearing loss compensation algorithm executed by the processor 101 from the on-set exploits correct electroacoustic calibration parameters. From a manufacturing perspective, the electroacoustic calibration parameters held in the EEPROM 212 improve manufacturing flexibility of the RIE modules by simplifying a switch between electroacoustic transducers from different component suppliers because possible random or systematic differences of electroacoustic performance can be compensated in straight-forward manner by the measuring and storing the electroacoustic calibration parameters.

The skilled person will understand that the module data stored in the EEPROM 212 may comprise additional data for example indicating physical or electrical characteristics of the RIE Module 200 in question. The module data may include the previously discussed unique identification code or the non-unique code indicating a particular type or variant of the RIE Module 200. The latter non-unique code may indicate various types of physical characteristics or features of the RIE Module 200 in point for example the type and number of transducers and/or sensors, dimensions of the compressible plug 120 and/or length of the wiring of the connector assembly etc.

The electroacoustic calibration parameters, and possibly other types of module associated data as discussed above, are preferably determined and stored the EEPROM 212 in connection with the manufacturing of the RIE module 200. The manufacturing methodology may for example comprise steps of:

a) coupling the sound output port 120 of the RIE module to an acoustic coupler of an electroacoustic test system where the acoustical coupler comprises known and stable acoustic load to the receiver. The acoustical coupler may comprise well-known occluded ear simulators such as IEC 711 coupler. A suitable signal generator of the electroacoustic test system generates an electric stimulus signal of predetermined level and frequency and applies the stimulus signal to the receiver or miniature loudspeaker via the terminals P1 and P2 of the connector plug 114. A corresponding output sound pressure is generated at the sound output port 120 and the sound pressure is measured in the acoustic coupler. The electric stimulus signal may comprise one or numerous measurement frequencies as discussed above and the sound pressure may be measured in the acoustic coupler at each frequency to map the frequency response of the receiver. The electroacoustic test system thereafter determines the electroacoustic calibration parameters by comparing the measured output sound pressure(s) at the one or several test frequencies and known or nominal electroacoustic characteristics of the receiver. The electroacoustic test system thereafter calculates the respective values of the corresponding electroacoustic calibration parameters adhering to the known format or encoding of the electroacoustic calibration parameters e.g. expressed as relative values or absolute values. The electroacoustic test system thereafter writes the determined and properly formatted electroacoustic calibration parameters to the non-volatile memory circuit, e.g. an EEPROM, of the RIE module 200 via the single-wire data interface for permanent storage. The electroacoustic test system may proceed to write any of the previously discussed other types of data to the non-volatile memory circuit 212 of the RIE module 200.

Figure 3:
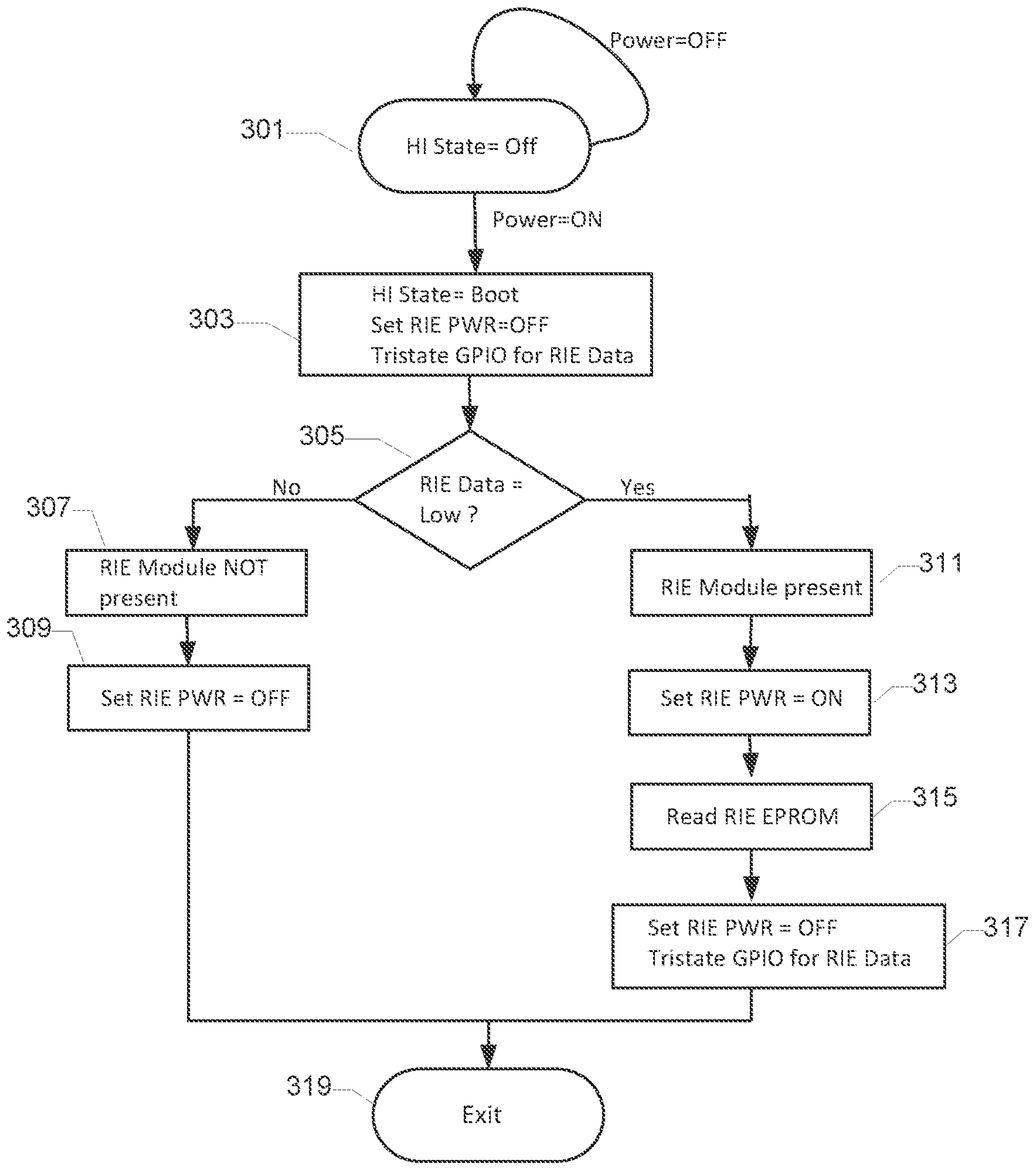
FIG. 3 shows a flow chart of a boot sub-routine executed by a processor of the Receiver-in-Ear hearing instrument, FIG. 4A) shows a flow chart of a RIE module detection sub-routine executed by the processor of the Receiver-in-Ear (RIE) hearing instrument.

FIG. 3 shows a flow chart of program steps or functions of a boot sub-routine or boot application executed by the processor of the Receiver-in-Ear (RIE) hearing instrument 100 immediately after power-on. The boot sub-routine resides in an off-state 301 of the RIE hearing instrument as long as the latter resides in an off-state for example because the hearing aid user has manually interrupted the battery supply—"Power=OFF". In step 303, the battery supply is activated and the processor powered-up and begins to load the boot sub-routine from program memory and executing the boot sub-routine. The processor interrupts or removes the power supply to the EEPROM by tri-stating the previously discussed GPIO port of the processor delivering the positive power supply $V_{CC}$ of the EEPROM. The processor furthermore tri-states the data port 137 connected to the data interface of the EEPROM allowing the voltage, and hence logic state, on the data interface wire (214 on FIG. 2) to be controlled by the first and second resistance elements 10*R, R. In step 305, the processor proceeds to read a logic state of the voltage on the data interface wire (214 on FIG. 2) by reading through the controllable input-output data port to determine whether the RIE module is electrically connected or disconnected from the BTE housing. The resistive divider formed by the previously discussed the first and second resistance elements, where element 10*R has about 10 times a resistance of the resistor R, ensures that the logic state of the data interface wire 214 is logic low if the RIE module is electrically connected. The logic low state is caused by the pull-down of the connector wire 214 to approximately one-tenth of the positive DC supply voltage via the ground potential of the GPIO port. In this case, the processor proceeds to step 311. One other hand, if the RIE module is electrically disconnected from the BTE housing, the logic state of the data interface wire 214 is driven to logic high due to the pull-up action of the resistance element 10*R pulling the voltage of the data interface wire 214 to approximately the reference voltage Vrf. In this case, the processor proceeds to step 307 where the processor concludes that the RIE module is absent or disconnected and the voltage on the wire 216, connected to the positive voltage supply of the EEPROM 212, can be left unpowered. The processor proceeds to exit the boot sub-routine in step 319 and may of course power-down various electronic components of the BTE module since the overall hearing instrument is non-operational.

If the RIE module is present or electrically connected, the processor proceeds through step 311 and to step 313 where the processor activates the GPIO port connected to the positive voltage supply of the EEPROM 212 by setting the DC voltage on the GPIO port to the required operational level of the particular type of EEPROM—for example between 1.2 V and 2.5 V such as about 1.8 V. In other words, the high state of the GPIO port now serves to energize the non-volatile memory circuit by switching to its operational state preparing for read-out of the stored module data and optionally for storage of additional module data supplied by the processor via the bi-directional data interface. The processor proceeds to step 315 where the processor reads the stored module data comprising the electroacoustic calibration parameters of the receiver, and optionally the electroacoustic calibration parameters of one or both of the microphones of the RIE module as discussed above, from the EEPROM. After the module data has been read, and possibly error-checked or otherwise verified, the processor deactivates the EEPROM by tri-stating the GPIO port and thereby interrupt the positive power supply of the EEPROM in step 317. In step 317, the processor also tri-states the data interface port (137 on FIG. 2) such that the logic state of the data interface connector wire 214 once again is controlled by the first and second resistance elements 10*R, R whereby any subsequent disconnection of the RIE module can be detected by the processor by detecting a change of logic state of the data interface connector wire 214 as outlined above. The processor exits the boot sub-routine in step 319 and carries on to utilize the read-out module data during execution of the previously discussed hearing loss compensation algorithm during normal operation of the hearing instrument.

Figures 4A, 4B:
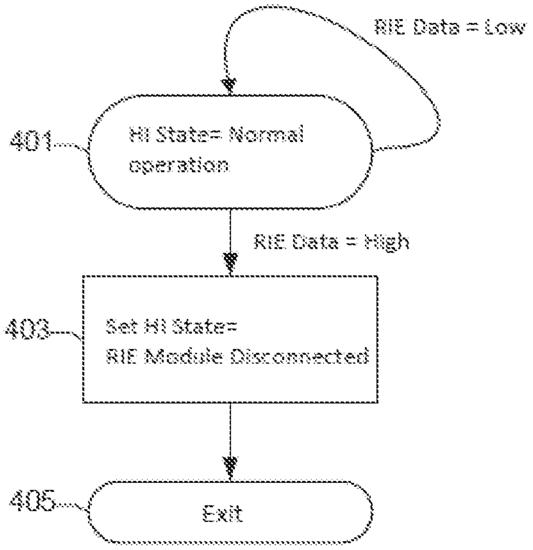
FIG. 4B) summarizes various operational states of the Receiver-in-Ear hearing instrument.

FIG. 4A) shows a flow chart of a RIE module detection sub-routine executed by the processor of the Receiver-in-Ear hearing instrument during normal operation of the hearing instrument, i.e. the operational state typically entered after successful exit from the previously discussed boot sub-routine. In step 401, the processor repeatedly reads the logic state of the data interface connector wire 214 and as long as the logic state remains low, the processor concludes the RIE module is connected and the processor continues to monitor the logic state of the data interface connector wire 214. When, or if, the processor detects a change of logic state of the data interface connector wire 214—"RIE Data=High", the processor proceeds to step 403 where the hearing instrument processor concludes that the RIE module is disconnected with the possible consequences discussed above. The RIE module detection sub-routine is thereafter exited in step 405.

Table 450 of FIG. 4B) summarizes the respective exemplary voltages on the data interface connector wire 214 "RIE PWR", on the EEPROM supply voltage connector wire 216 "RIE Data", during the previously discussed operational states of the Receiver-in-Ear hearing instrument, i.e. off, Boot, Normal operation, and RIE module disconnect. The DC supply voltage of the EERPOM is set to 1.8 V in the illustrated embodiment. As indicated in the last row of the table 450 the added current consumption of the first and second resistance elements 10*R, R remains relatively modest while still allowing a simple detection of the connected and disconnected states of the RIE module using the existing data interface wire 214.

The invention claimed is:

1. A detachable portion of a hearing instrument comprising:

a housing, at least a part of the housing being configured for placement in an ear canal of a user;

a connector configured for electrically coupling to a behind-the-ear (BTE) component of the hearing instrument;

a receiver or miniature loudspeaker being accommodated in the housing;

a cable extending between the housing and the connector; and a non-volatile memory configured to store data;

wherein the non-volatile memory is located in the housing accommodating the receiver or the miniature loudspeaker; and wherein the detachable portion further comprises a ground wire, wherein the ground wire is in the housing that is configured for placement in the ear or the ear canal of the user.

2. The detachable portion according to claim 1, further comprising a microphone accommodated in the housing, wherein the ground wire is coupled to the microphone.

3. The detachable portion according to claim 2, wherein the ground wire is also coupled to the non-volatile memory.

4. The detachable portion according to claim 1, wherein the ground wire implements a ground, a first part of the ground being in the housing.

5. The detachable portion according to claim 4, wherein a second part of the ground is in the cable.

6. The detachable portion according to claim 1, further comprising two conductors that are associated with the non-volatile memory, and a resistor coupled between the two conductors.

7. The detachable portion according to claim 1, further comprising an earpiece configured to accommodate the at least a part of the housing.

8. The detachable portion according to claim 7, wherein the earpiece is wider than a cross sectional width of the housing.

9. The detachable portion according to claim 1, wherein the hearing instrument is configured to compensate hearing loss, and wherein the non-volatile memory is located in the housing of the detachable portion of the hearing instrument that is configured to compensate the hearing loss.

10. The detachable portion according to claim 1, wherein the non-volatile memory is located closer to the receiver or the miniature loudspeaker than the connector.

11. The detachable portion according to claim 1, wherein the ground wire is electrically coupled to the connector.

12. The detachable portion according to claim 1, wherein the connector has a connector housing surface configured to face towards the BTE component when the connector is connected to the BTE component, and wherein the connector comprises electrically-conductive pads lying within a common plane that corresponds with the connector housing surface configured to face towards the BTE component.

13. A hearing instrument comprising the detachable portion of claim 1 and the BTE component.

* * * * *